Dec. 12, 1933.  L. R. BURR  1,939,385
ROTARY RAKE
Filed March 17, 1932  3 Sheets-Sheet 1
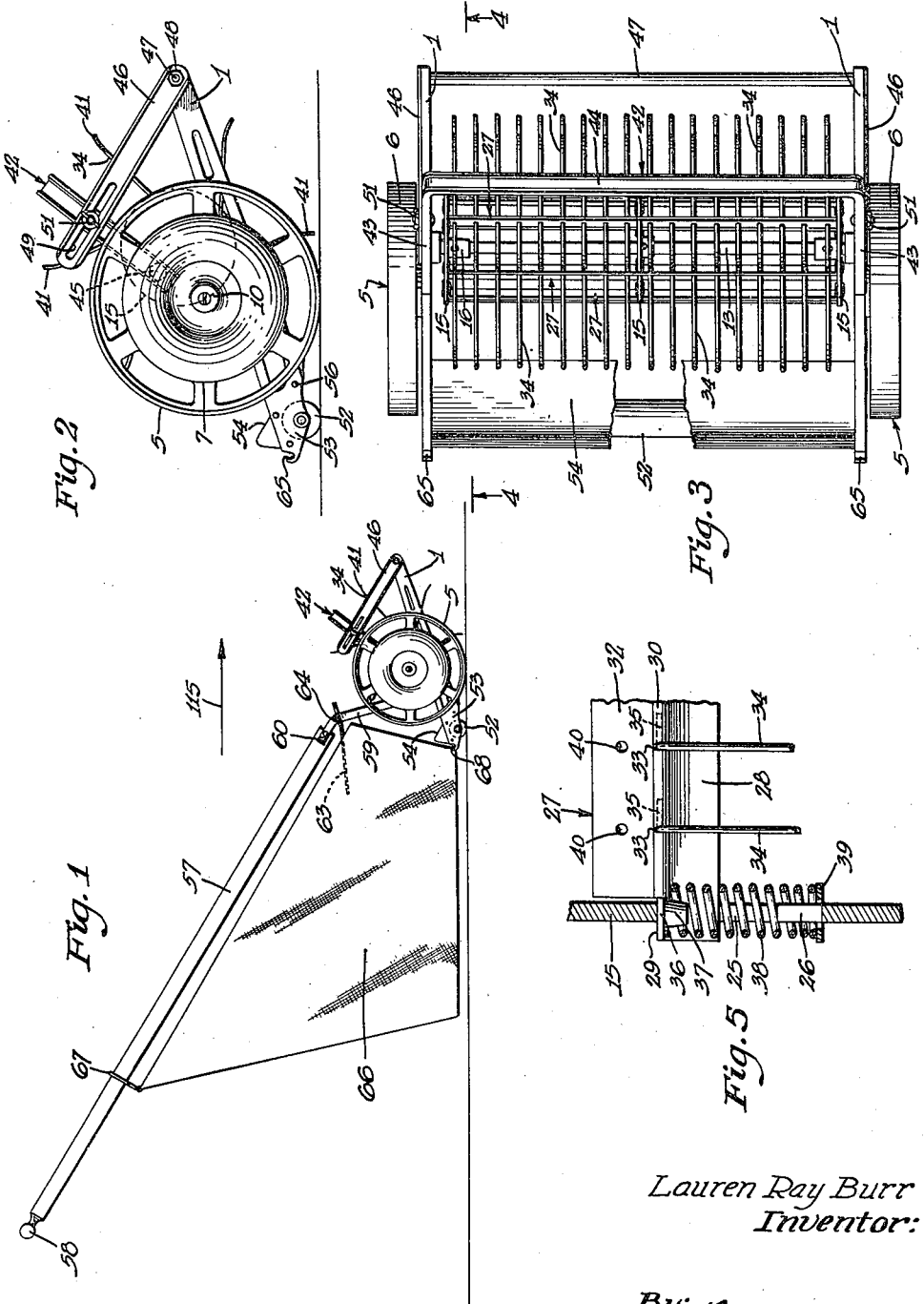
Lauren Ray Burr
Inventor:
By: Munn & Co.
Att'ys.

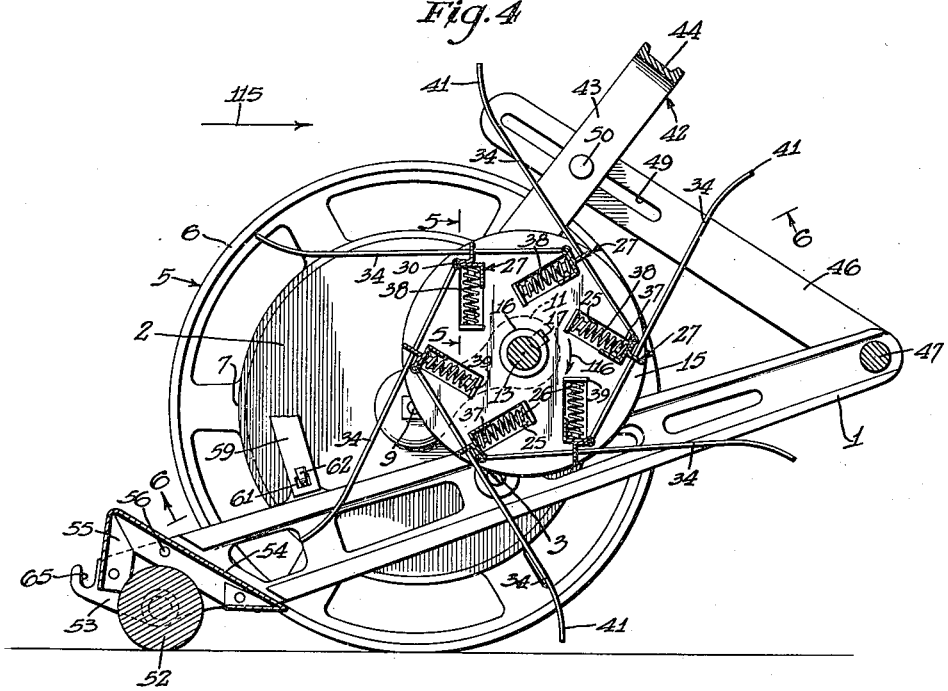

Dec. 12, 1933.   L. R. BURR   1,939,385
ROTARY RAKE
Filed March 17, 1932   3 Sheets-Sheet 3
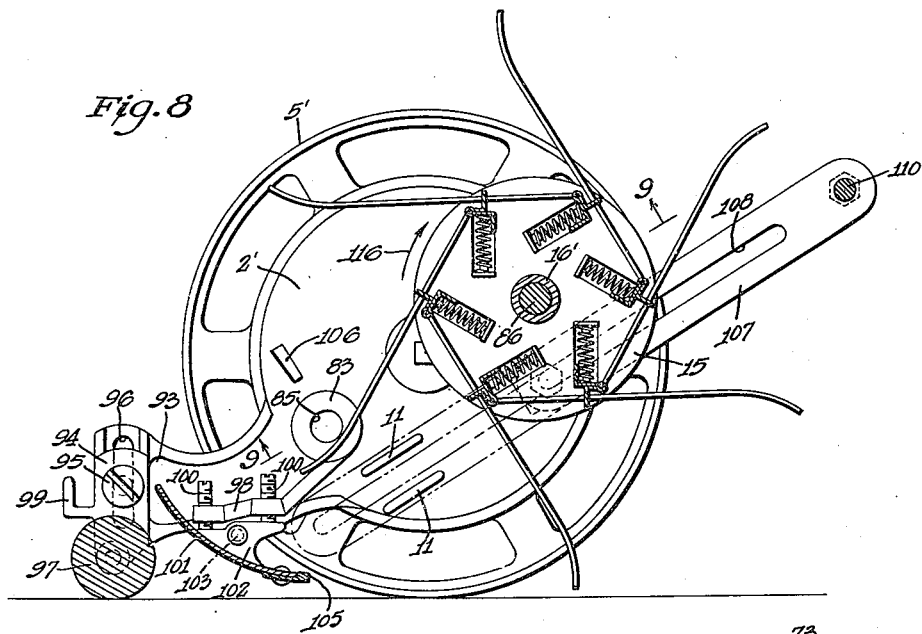
Fig. 8
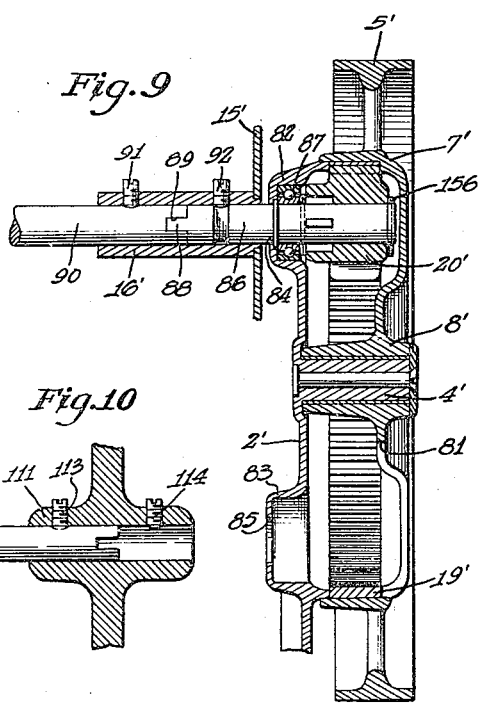
Fig. 9
Fig. 10
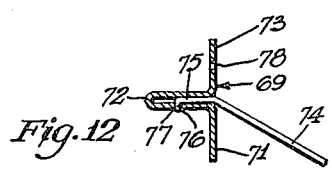
Fig. 12
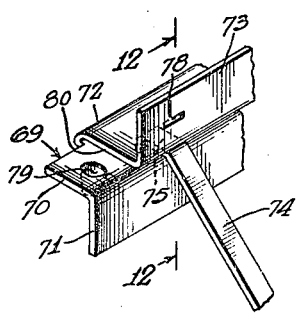
Fig. 11
Lauren Ray Burr.
Inventor:
By: Munn & Co.
Att'ys.

Patented Dec. 12, 1933

1,939,385

UNITED STATES PATENT OFFICE 1,939,385

ROTARY RAKE

Lauren Ray Burr, Joliet, Ill.

Application March 17, 1932. Serial No. 599,514

8 Claims. (Cl. 55—145)

My invention relates to improvements in rotary rakes, particularly of the type for raking lawns, and it consists in the combinations, constructions, and arrangements herein described and claimed.

An object of my invention is to provide a rake of the rotary type having means for preventing the tines from collecting debris, such as leaves.

A further object of my invention is to provide a rake of the rotary type in which the rotating tines pass over the ground with a sweeping motion.

A further object of my invention is to provide a rake of the rotary type in which the construction is such that the rotating tines will throw or kick the elements being raked into a receptacle.

A further object is to provide a rake of the rotary type in which the construction is such that the rotating tines will function effectively whether the ground is even or uneven.

Another advantage of my invention is to provide a rake of the rotary type in which the rotating tines may be resiliently mounted so that they may yieldingly impinge the ground or the elements being raked for reducing to a minimum the possibility of the tines digging into or piercing the ground or the elements.

Another object is to provide novel means for adjustably positioning the tine-supporting shaft with respect to the ground.

A further object is to provide a rake of the rotary type in which the rotary raking structure may be removed and replaced by a rotary cutter.

Other objects and advantages will appear in the following specification, and the novel features of the invention will be particularly pointed out in the appended claims.

My invention is illustrated in the accompanying drawings, forming part of this application, in which Figure 1 is a side elevation of my device, Figure 2 is an enlarged side elevation of a portion of the device shown in Figure 1, Figure 3 is a top plan view of my device as shown in Figure 2, a portion thereof being broken away, Figure 4 is an enlarged sectional detail view of my device taken along the line 4—4 of Figure 3, Figure 5 is a sectional detail view taken along the line 5—5 of Figure 4, Figure 6 is a sectional detail view taken along the line 6—6 of Figure 4, Figure 7 is an isometric detail view of a portion of the tine-retaining structure of my device, Figure 8 is a vertical sectional detail view of a modified form of my device showing certain structure incorporated therein whereby the rotary raking structure and a rotary cutter may be used interchangeably with the remainder of the structure, Figure 9 is an enlarged sectional detail view taken along the line 9—9 of Figure 8, Figure 10 is a sectional detail view showing the manner in which a rotary cutter may be substituted for the rotary rake structure and connected with the structure shown in Figures 8 and 9, Figure 11 is an isometric detail view of a modified form of the tine-retaining structure, and Figure 12 is a sectional detail view taken along the line 12—12 of Figure 11.

In carrying out my invention, I provide a pair of spaced-apart arm members 1. The arm members 1 may be movably or pivotally connected with stationary plate members 2 positioned on the exterior sides thereof by any suitable means, such as bolts or screws 3, as shown in Figures 4 and 6. The stationary plate members 2 may be provided with threaded openings, not shown, for receiving the bolts or screws 3. The stationary plates 2 are further provided with axle portions 4, as shown in Figure 6, which may be integral therewith or otherwise fixedly connected thereto.

A wheel 5 is associated with each of the stationary plate members 2 and comprises a rim portion 6 and a web portion 7. The web portions 7 are provided with hub portions 8 for being mounted on the axle portions 4. Bolt members 9 extend longitudinally through the axle portions 4 and are connected with cap portions 10 for retaining the wheels on the axle portions. The plate members 2 are formed for providing bearing retaining portions 11 having aligned openings 12 therethrough, as shown in Figure 6.

A rotary shaft 13 extends through the aligned openings 12 and is mounted in bearings 14 which are disposed in and bear against the bearing retaining portions 11. Plate members 15 are concentrically mounted on the shaft 13 and are provided with collar portions 16 which may be integral or otherwise fixedly connected therewith. The collar portions 16 are provided with set screws 17 for engaging the shaft 13 whereby the plate members 15 may be fixedly connected with the shaft 13.

While I have shown my device as being provided with three plate members 15 mounted on the shaft, as shown in Figure 3, it will be readily understood that any number from two to several plate members may be mounted on the shaft 13, as desired.

On referring to Figure 6, it will be noted that the web portion 7 of one of the wheels 5 is formed for receiving an internal gear member 18 having teeth 19. The internal gear member 18 may be fixedly connected with the web portion 7 in any suitable manner, not shown, or it may be integral therewith. A pinion gear 20 is mounted on the shaft 13 and is provided with teeth 21 in mesh with the teeth 19 of the internal gear 18. The gear 20 may be retained upon the shaft 13 by any suitable means, such as by the flange portion 22 of the web portion 7, which the teeth of the pinion gear may abut when the wheel is mounted on the axle portion 4. Ratchet means 24 may be associated with the shaft 13 and the gear 20 so that the shaft 13 may be rotated only when the gear 20 is rotating in a given direction, and that the gear 20 may be reversely rotated without rotating the shaft 13.

As shown in Figure 6, the shaft 13 is provided with an opening for receiving a cotter pin 150 positioned between the bearing 14 and the pinion gear 20. A washer 154 is positioned between the cotter pin 150 and the gear 20. The cotter pin tends to prevent longitudinal movement or thrust of the shaft 13 and pinching of the gear 20. While I have shown and described the above construction in connection with a wheel 5 associated with one end of the shaft 13, it will be understood that the same construction may be used in connection with the wheel associated with the other end of the shaft 13.

It will be noted that the plate members 15 are provided with a plurality of aligned slotted openings 25 therethrough. The plate members are provided with projecting portions 26 extending into the slotted openings. The slotted openings in the intermediate plate members 15 may extend to the periphery of the plate members for enabling the tine-retaining members to be operatively connected with the plate members after the tines have been connected with the tine-retaining members. A plurality of tine-retaining members or bars 27 are transversely positioned with respect to the plates 15 and extend through the openings 25. The tine-retaining members 27 are identical in construction and therefore a description of one will suffice for all. A portion of one of the tine-retaining members is shown in detail in Figure 7. Each of the tine-retaining members comprises a bar member having side portions 28 and 29.

The side portion 29 is formed back on itself for providing a looped portion 30 and a passageway 31 and terminates in a longitudinally extending flange portion 32. The looped portion 30 is provided with spaced-apart slotted openings 33 therein for receiving tines 34. The tines 34 are provided with bent end portions 35 which extend in the passageway 31 thereby connecting the tines 34 with the tine-retaining member 27. The end portions of the tine-retaining member 27 are cut away as at 36 so that the loop portion 30 and the flange portion 32 do not extend within the slotted openings 25 of the plate members 15. The end portions of the tine-retaining members 27 are provided with lug portions 37 which are positioned within the slotted openings 25.

Spiral springs 38 are disposed in the slotted openings 25 of the plate member 15 and extend over the lug portions 37 of the tine-retaining members 27 and the projecting portions 26 of the plate members. Spring bearing members 39 are disposed on the projecting portions 26 of the plate member 15 and are positioned between the spiral springs 38 and the plate member for providing an even bearing surface for the springs.

The flange portions 32 of the tine-retaining members 27 are provided with openings 40 therein which are equally spaced apart the same distance as the slotted openings 33 in the looped portion 30 of the tine-retaining member 27. The tines 34 connected with each tine-retaining member extend slidably through the openings 40 of the flange portion 32 of the next succeeding tine-retaining member, as clearly shown in Figures 3 and 4.

The tines 34 are provided with curved end portions 41, as shown in Figure 4. A U-shaped bar member 42 comprises side portions 43 and a cross portion 44. The side portions 43 have their end portions fixedly connected with the stationary plate members 2 by any suitable means, such as bolts 45. A pair of arms 46 has ends connected with a rod member 47, which extends between the spaced-apart arm members 1, by any suitable means, such as nuts 48.

The rod member 47 functions as a bumper means for protecting the tines 34. The arms 46 are provided with slotted openings 49 therein for receiving bolt members 50 which are connected with the side portions 43 of the U-shaped bar member 42, and which extend through the slotted openings 49 and are connected with the arms 46 by any suitable means, such as wing nuts 51. This construction permits the arm members 1 to be adjustably positioned with respect to the U-shaped bar member 42. A roller 52 is transversely positioned between the arm members 1 and is rotatably mounted in the end portions 53 of the arm members.

By loosening the wing nuts 51, the arms 46 may be moved for adjustably positioning the spaced-apart arm members 1 which determine the position of the roller 52 with respect to the stationary plate members 2. The position of the roller 52 determines the elevational position of the shaft 13 with respect to the ground and consequently also determines the elevational positions of the tines with respect to the ground. When the ends of the arms 1 with which the arms 46 are connected are moved toward the bar member 42, the shaft 13 and the tines are moved toward the ground, and when the arms are moved away from the bar member 42, the shaft 13 and the tines are moved away from the ground.

A deflecting plate member 54 is transversely positioned between the arm members 1 and is disposed over the roller 52. The deflecting plate member is provided with flanged end portions 55 for being connected with the end portions 53 of the arm members 1 by any suitable means, such as bolts or rivets 56.

A handle member 57 has an end provided with grip portions 58. A pair of bale members or arms 59 is positioned on opposite sides of the handle member 57 and is fixedly connected therewith by any suitable means, such as bolts or rivets 60. The bale members 59 are provided with openings 61 therein for receiving lug portions 62 which in turn are connected with the arm members 1, thereby providing means for connecting the handle member 57 with the arm members 1.

As shown in Figure 1, a deflector plate 63 may be provided and may be connected with the bale members 59 by any suitable means, such as rivets 64. The arm members 1 are provided with hook-shaped end portions 65. A receptacle 66 is provided which may be constructed of any suitable material, such as canvas or light metal, and has an end connected with the handle 57 by any desired means, such as a tie member 67. The lower and forward end of the receptacle is provided with means, such as a rod or pins 68, for being connected with the hook portions 65 of the arm members 1.

On referring to Figure 11, it will be noted that I show a modified form of tine-retaining means. This form of tine-retaining means comprises an angle bar 69 comprising flange portions 70 and 71. The flange portion 70 is bent back upon itself at 72 and formed for providing a flange portion 73 in substantially the same plane with the flange portion 71. In this instance, I have shown the manner in which flat tines 74 may be connected with the tine-retaining member. Each of the flat tines 74 has an end portion 75 extending between the flange portions 70 and 72 of the tine-retaining member and is provided with a bent end portion 76 which extends through an opening 77 in the flange portion 70.

The openings 77 in the flange portion 70 are disposed in equally spaced-apart position in the same manner that the slotted openings 33 are disposed in spaced-apart positions in the tine-retaining member 27. The flange portion 73 is provided with equally spaced-apart openings 78 therethrough which are analogous with the openings 40 in the flange portion 32 of the tine-retaining member 27. The end portion of the flange portion 70 is provided with projecting portions 79 which correspond to the lug portions 37 of the tine-retaining member 27 for receiving the springs 38. The flange portion 70 is provided with a cut-away portion 80 whereby the end portions of the flange portions 70 and 71 may extend within the slotted openings 25 in the rotatable plate member 15 in the same manner as do the end portions of the flange portions 28 and 29 of the tine-retaining member 27.

On referring to Figures 8, 9 and 10, it will be noted that I have shown a modified form of my device in which the rotary raking structure may be removed and a rotary cutter used. In this form of my device, I provide the conventional wheel 5' having a web portion 7' similar to the web portion 7 except that it is provided with a relatively large opening 81. If so desired, the opening 81 may be provided with a removable cover, not shown, for keeping dirt out of the gears. The web portion 7' is provided with a hub portion 8' which is mounted on a bearing portion 4' of a stationary plate member 2'. The stationary plate member 2' is similar to the plate member 2 shown in Figures 4 and 6 except that it is provided with a pair of bearing retaining portions 82 and 83 instead of the single bearing retaining portion 11. The bearing retaining portions 82 and 83 are provided with annular openings 84 and 85, respectively.

A shaft 86 extends through the opening 84 in the bearing retaining portion 82 and is rotatably mounted in bearings 87 which are disposed within the bearing retaining portion 82. A pinion gear 20' is mounted on the shaft 86 in the same manner as the gear 20 is mounted on the shaft 13. The pinion gear 20' is in mesh with the teeth of an internal gear 19' which is connected with the web portion 7' of the wheel 5' in the same manner as the internal gear 19 is connected with the web portion 7 of the wheel 5. The gear 20' is held against longitudinal movement with respect to the shaft 86 by means of cotter pins 156 so that the shaft 86, the bearings 87, and the pinion gear 20' may be removed as a unit.

The shaft 86 is provided with a projecting end portion 88 which is receivable in a recess 89 in the end portion of a shaft 90. A collar 16' is mounted on the shafts 86 and 90 and is provided with threaded openings therein for receiving set screws 91 and 92. The collar 16' is so positioned on the shafts 86 and 90 that the end portions of the shafts having the projecting portion 88 and the recess 89 will be positioned between the set screws 91 and 92 so that the set screw 92 may be moved for fixedly connecting the collar 16' with the shaft 86, and in like manner the set screw 91 may be moved for also connecting the collar with the shaft 90. The plate member 15' is fixedly connected with the collar 16' by any suitable means, such as sweating or welding, and is adapted for carrying the tine-retaining members in the manner heretofore described.

On referring to Figure 8, it will be noted that each of the stationary plate members 2' is provided with a rearwardly extending portion 93. An arm 94 is provided with an opening therethrough for receiving a screw or bolt 95 which extends through a slotted opening 96 in the extending portion for adjustably connecting the arm 94 with the extending portion. Each of the arms 94 is provided with a hook shaped projecting portion 99 for having a receptacle connected therewith. A roller 97 is rotatably mounted in the spaced-apart arms 94. The rearwardly extending portion 93 is also provided with a transverse flange portion 98 having spaced-apart threaded openings therein for receiving set screws 100.

A blade 101 is provided with shoulder end portions 102 which are provided with aligned supporting pins 103 receivable in openings in the rearwardly extending portions 93. The blade 101 is provided with a cutting portion 105.

It will be seen from the above description that the cutting blade is pivotally connected with the rearwardly extending portions 93 by means of the supporting pins 103 and that it may be adjusted angularly by rotating the set screws 100 which are connected with the rearwardly extending portion 93 and in engagement with the shoulder portions 102 of the blade 101.

It will be noted in this connection that the roller 97 may be adjustably positioned with respect to the extending portions 93 for determining either the elevational positions of the tines and the shaft with respect to the ground, or for determining the height at which it is desired that the lawn be cut. In this form of my device the stationary plate members 2' are provided with lug portions 106 whereby the bale members connected with the handle may be connected directly with the plate members 2'.

A channel bar 107 is associated with each of the stationary plate members 2' and is provided with a slotted opening 108 therein for receiving a bolt member 109 connected with the stationary plate member. A rod 110 has its ends connected with the end portions of the spaced-apart bars 107 in substantially the same manner as the rod 47 is connected with the supporting arms 1.

The stationary plate member 2' may be provided with lug portions 11 which are disposed in spaced-apart positions but are sufficiently close together so that the distance between their outside edges is substantially the same as the distance between the inside edges of the flange portion of the channel bars 107 so that when the channel bar 107 is moved to the dotted line position shown in Figure 8, the lug portions 11 may be disposed between the flange portions for holding the channel bar against lateral movement.

In Figures 8 and 9, the device is shown as being adapted for use as a rotary rake. When the device is to be used as a mower the set screw 92 is loosened for disconnecting the collar 16' from the shaft 86. The wheel 5' is then rotated for positioning the opening 81 in alignment with the shaft 86, at which time the shaft 86, the gear 20' and the bearing members 87 may be withdrawn through the opening 81, thereby permitting the collar 16' and the rotary plate member 15', together with the shaft 90, to be removed.

The shaft 86 is then inserted through the opening 85 and the bearing member 87 and the pinion gear 20' disposed thereon in their previous positions and relationship. A rotary cutter having a collar portion 111 shown in Figure 10 is fixedly connected with a cutter shaft 112 by means of a set screw 113 connected with the collar portion and in engagement with the shaft 112. The collar portion 111 may likewise be connected with the shaft 86 by means of a set screw 114.

From the foregoing description of the various parts of the device, the operation thereof may be readily understood. When the device is in operation, it is moved in the direction of the arrow 115, see Figures 1 and 4, thereby rotating the wheels 5. The rotation of the wheels is transmitted to the shaft 13 rotating the same through the media of the internal gear 18 and the pinion gear 20. The rotation of the shaft 13 is transmitted to the rotary plates 15 for rotating them in the direction of the arrow 116. As the plates 15 are rotated, the rows of tines are moved into successive engagement with the ground.

It will be noted that the openings 25 in the plates 15 are so angularly arranged with respect to the axis of rotation that when a row of tines engage the ground, the resistance to the tines will cause the respective springs to be compressed. As the plate members 15 continue their rotation, the tines will be drawn or raked over the ground to the point at which they move out of engagement with the ground, at which time the compressed springs will quickly move the tines back to their normal position thereby throwing or kicking the elements or debris which has been gathered by the tines into the receptacle 66.

It will be noted that the deflector 63 is so positioned that any stones or hard materials which are thrown or kicked when the tines are released will not be hurled in the face of the operator. This throwing or kicking action of the tines supplements the centrifugal force created by the rotating tines which also tends to throw the elements collected outwardly.

The lower deflecting plate 54 is positioned close to the ground so that the elements being raked, such as leaves which get only a weak kick or throw from the rotating tines, may be deflected into the receptacle by the pushing action of the succeeding elements or leaves being raked. Furthermore, the plate member 54 also functions to prevent the contents of the receptacle from being jarred out of the receptacle.

It will be noted that the tines are so mounted that they may resiliently engage the ground at an acute angle instead of vertically thereby passing over the ground with a raking or sweeping motion instead of a digging action. The spring members permit the tines to resiliently engage the ground so that they will not dig into the ground nor the elements being raked, and also will spring up and down to compensate for the unevenness of the ground.

It will be noted that the tine-retaining members have a double function in that they are adapted for having the ends of the tines in one row fixedly connected therewith and also for resiliently supporting the tines in the preceding row. The tines may be constructed of a resilient material, such as spring steel, so that they may have a resiliency of their own in addition to the resiliency afforded by the action of the springs 38.

While I have shown the shaft as being operatively connected with the wheels whereby the shaft may be rotated when the wheels are rotated, it will readily be understood that the shaft may be rotated independently of the wheels by connecting any suitable power means therewith, such as a motor.

While I have shown and described my device as having a certain specific structure, it will readily be understood that certain modifications and changes may be made without departing from the spirit or scope of my invention.

I claim:

1. A rotary rake comprising a pair of spaced-apart transport wheels, a rotary shaft carried by the wheels means for rotating said shaft, a plurality of tine-retaining means carried by the shaft and radially disposed in spaced-apart positions with respect thereto, and a plurality of tines each having an end portion pivotally connected with one of the tine-retaining means and an intermediate portion slidably connected with another tine-retaining means.

2. A rotary rake comprising a pair of spaced-apart transport wheels, a rotary shaft carried by the wheels, a plurality of tine-retaining means movably carried by the shaft and radially disposed in spaced-apart positions with respect thereto, spring means for yieldingly retaining the tine-retaining means in their positions, and tines each having an end portion pivotally connected with one of the tine-retaining means and an intermediate portion connected with another tine-retaining means.

3. A rotary rake comprising a pair of transport wheels, a transverse rotatable shaft carried thereby, means for rotating said shaft, tine carrying means on said shaft comprising a plurality of spring resisted bars, and a plurality of tines pivotally secured to each of said bars and extending transversely of an adjacent bar and being yieldingly held by the latter in raking position.

4. A rotary rake comprising a pair of transport wheels, a rotatable transverse shaft carried thereby, means for rotating said shaft, a plurality of apertured discs secured to said shaft and being rotatable therewith, transverse spring resisted bars positioned in said apertures, and a plurality of tines pivotally secured to each of said bars and being engaged by the succeeding bar and yieldingly held by the same in raking position.

5. A rotary rake comprising a pair of spaced apart ground wheels, a rotatable shaft carried thereby, means for rotating said shaft, a plurality of yieldingly mounted tine carrying means on said shaft, and a plurality of spring resisted tines each movably secured to one of said means and being disposed substantially normal to the direction of yielding movement of an adjacent carrying means and being attached to the latter.

6. Apparatus of the class described comprising a pair of transport wheels, a supporting structure carried thereby, a rotatable shaft carried by said structure and being offset axially from the axis of said wheels, a plurality of implements carried by said shaft, a lever pivoted to said structure and having a ground contacting roller at one end, and a link pivoted to the opposite end of said lever and being adjustably secured to a portion of said structure for effecting the movement of said shaft arcuately with respect to the axis of rotation of said wheels for varying the elevation of said implements.

7. Apparatus of the class described comprising a pair of ground wheels, a rotary structure carried thereby, means for rotating the same, said structure comprising a plurality of yieldingly mounted tine carrying members, and a plurality of tines secured thereto, each of said tines being secured at one end to one of said members and extending transversely of and slidably attached intermediate its ends to an adjacent tine carrying member.

8. Apparatus of the class described comprising a pair of transport wheels, a supporting structure carried thereby, a rotatable shaft carried by said structure and being offset axially from the axis of said wheels, a plurality of implements carried by said shaft, a lever pivoted to said structure and having a ground contacting roller at one end, and an adjusting link secured to said lever and to said structure for effecting the movement of said shaft arcuately with respect to the axis of rotation of said wheels for varying the elevation of said implements.

LAUREN RAY BURR.